United States Patent [19]
Sumida et al.

[11] Patent Number: 5,507,659
[45] Date of Patent: Apr. 16, 1996

[54] LEVER TYPE CONNECTOR

[75] Inventors: Tatsuya Sumida; Yasuo Matsushita, both of Yokkaichi, Japan

[73] Assignee: Sumitomo Wiring Systems, Ltd., Yokkaichi, Japan

[21] Appl. No.: 328,608

[22] Filed: Oct. 25, 1994

Related U.S. Application Data

[63] Continuation of Ser. No. 83,505, Jun. 30, 1993, abandoned.

[30] Foreign Application Priority Data

Aug. 10, 1992 [JP] Japan ................ 4-056047 U

[51] Int. Cl.⁶ .................................................. H01R 13/62
[52] U.S. Cl. .................... 439/157; 439/876; 439/79
[58] Field of Search .................... 439/78, 79, 82, 439/83, 874–876, 271–276, 152–160

[56] References Cited

U.S. PATENT DOCUMENTS

| | | | |
|---|---|---|---|
| 4,152,038 | 5/1979 | Inouye et al. | 439/157 |
| 4,367,003 | 1/1983 | Frantz. | |
| 4,586,771 | 5/1986 | Kramer et al. | 437/157 |
| 4,668,873 | 5/1987 | Ohba et al. . | |
| 4,758,183 | 7/1988 | Aoyama . | |
| 4,959,626 | 9/1990 | Mouissie . | |
| 5,033,972 | 7/1991 | Komatsu et al. | 439/153 |
| 5,124,888 | 6/1992 | Suzuki et al. | 439/76 |

FOREIGN PATENT DOCUMENTS

| | | |
|---|---|---|
| 0048085 | 3/1982 | European Pat. Off. . |
| 0332280 | 9/1989 | European Pat. Off. . |
| 0549371 | 6/1993 | European Pat. Off. . |
| 2166301 | 4/1986 | United Kingdom . |
| 2179506 | 3/1987 | United Kingdom . |

OTHER PUBLICATIONS

EPO Search Report and Annex.

*Primary Examiner*—David L. Pirlot
*Attorney, Agent, or Firm*—Greenblum & Bernstein

[57] ABSTRACT

A first connector is installed on an upper surface of a printed wiring board. A plurality of tabs is inserted into each inserting opening of the printed wiring board. The tabs are soldered on a lower surface of the printed wiring board. Then, a lever-holding casing holding a lever therein is installed on the connector.

4 Claims, 3 Drawing Sheets

LEVER TYPE CONNECTOR

This application is a continuation of application Ser. No. 08/083,505, filed Jun. 30, 1993, now abandoned.

BACKGROUND OF THE INVENTION

1. Field of the Invention

The present invention relates to a lever type connector and more particularly to the lever type connector in which a lever and a lever-holding casing can be prevented from being soiled or a sealing surface can be prevented from being thermally deformed in soldering a tab of one of mating connectors on a printed wiring board so as to seal the gap between each connector and a unit casing reliably.

2. Description of the Related Arts

The connector of this kind is used to connect a wire harness for use in a car and a unit such as a computer with each other.

A unit such as a computer unit is installed in the inside of the car in view of environmental problems. Owing to the expansion of the function of the computer unit caused by the progress of electronic control system, components are increasingly mounted in the car in such a degree that some components cannot be installed inside the car. It is conceivable that the computer unit is installed in an engine compartment, however, it is necessary to waterproof the computer unit with a component composed of rubber packing or the like.

With the expansion of the function of the computer unit, the number of poles has increased and thus a great force for connecting a plurality of connectors to each other is required. In addition, the resistance to the force required to insert the rubber packing between connectors to be connected to each other is great and thus a great force for connecting a plurality of connectors to each other is also required.

In order to meet the requirement, a lever type connector comprising male and female connectors have been proposed. In the lever type connector, a comparatively small force suffices to connect the male and female connectors to each other.

Normally, the lever of the lever type connector is mounted on a connector disposed on the computer unit side not on the wire harness side. The reason is as follows: If the lever is installed on the connector disposed on the wire harness side, there is a possibility that the lever is rotated from the original position or damaged accidentally while the wire harness is being assembled or installed in the car.

FIG. 4 shows an example of a conventional lever type connector comprising a male connector and a female connector. Let it be supposed that a lever 2 is rotatably supported on the male connector 1. The male connector is integral with a lever-holding portion 1a. The lever 2 is mounted on the lever-holding portion 1a. A plurality of tabs 3 incorporated in the male connector 1 is inserted downward into an inserting opening of a printed wiring board 4 in the direction from an upper surface 4a thereof and soldered on a lower surface 4b thereof. Then, the front end of a unit casing 5 is fixed to the male connector 1 with the printed wiring board 4 inserted into the unit casing 5, and a rear cover 7 is then fixed to the rear end of the unit casing 5 by an adhesive agent 8.

However, the lever-holding portion 1a projects downward from the lower surface 4b of the printed wiring board 4 when the tabs 3 of the connector 1 is soldered on the printed wiring board 4 with the tabs 3 inserted into the inserting opening thereof. As a result, the lever-holding portion 1a is immersed in a tank containing solder when flow soldering is performed, and consequently, the lever 2 and a sealing surface 1b are soiled or thermally deformed. Thus, the gap between the connector 1 and the unit casing 5 cannot be properly sealed.

SUMMARY OF THE INVENTION

It is an object of the present invention to provide a lever type connector in which the gap between connectors connected with each other and a unit casing can be preferably sealed.

In accomplishing this and other objects, there is provided a lever type connector comprising a lever for moving a second connector in an engaging direction or a disengaging direction in engaging a first connector and the second connector with each other. The first connector is installed on an upper surface of a printed wiring board; a plurality of tabs of the first connector are inserted downward into each of the inserting opening of the printed wiring board; the tabs are soldered on a lower surface of the printed wiring board; and a lever-holding casing holding the lever therein is installed on the first connector.

According to the above construction, the first connector is installed on the upper surface of the printed wiring board. The tabs of the first connector are inserted downward into each of the inserting openings of the printed wiring board. The tabs are soldered on the lower surface of the printed wiring board. The lever-holding casing holding the lever therein is installed on the first connector. The lever-holding casing is not installed on the first connector in soldering the tabs on the printed wiring board. Therefore, the lever-holding casing does not project downward from the lower surface of the printed wiring board. Even though the lower surface of the printed wiring board is immersed in a tank containing solder, neither the lever of the lever-holding casing nor the sealing surface thereof is soiled or thermally deformed. Accordingly, the gap between the first connector as well as the second connector connected with each other and the unit casing can be preferably sealed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
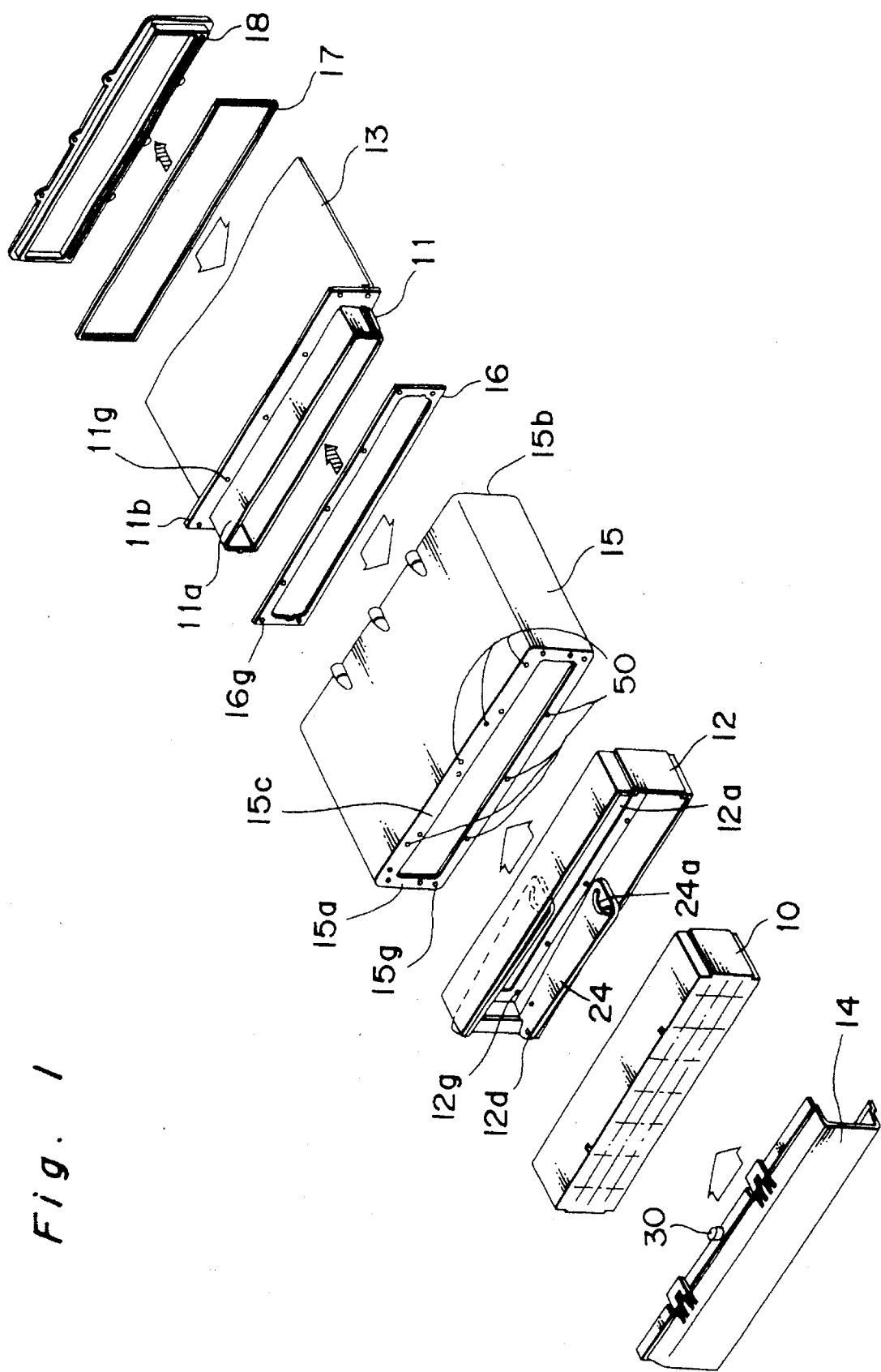
FIG. 1 is an exploded perspective view showing a lever type connector according to the present invention.

Before the description of the present invention proceeds, it is to be noted that like parts are designated by like reference numerals throughout the accompanying drawings.

Referring to the drawings, the lever type connector according to the embodiment of the present invention is described below.

Figure 2:
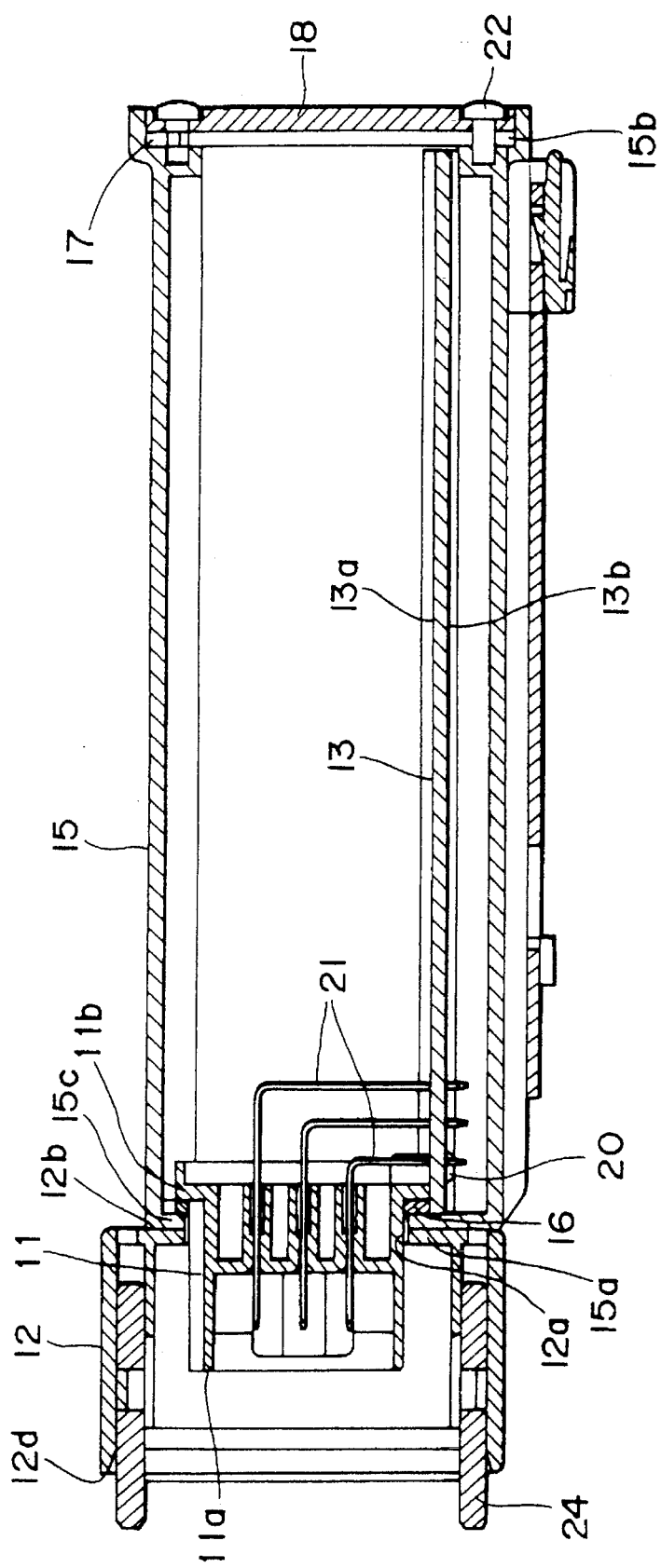
FIG. 2 is a sectional view showing the lever type connector of FIG. 1.

As shown in FIGS. 1 and 2, a lever type connector essentially comprises a female connector 10; a male connector 11; a lever-holding casing 12; and a printed wiring board 13 such as a computer unit. The lever type connector further comprises a waterproof cover 14, a unit casing 15, a forward rubber packing 16, a backward rubber packing 17, and a casing cover 18.

A flange portion 11b formed at an end, of the male connector 11, opposed to an engaging portion 11a thereof is fixed to the upper surface 13a of the printed wiring board 13 by means of a screw 20. The male connector 11 does not project downward from the lower surface 13b of the printed wiring board 13. A plurality of tabs 21 incorporated in the male connector 11 is inserted into an inserting opening of the printed wiring board 13 and then soldered on the lower surface 13b thereof.

The length of the unit casing 15 corresponds to the entire length of the printed wiring board 13. The unit casing 15 has on the front end surface 15a thereof an inner flange portion 15c for receiving the flange portion 11b of the male connector 11 inserted from the backward end surface 15b of the unit casing 15, with a forward rubber packing 16 interposed between the male connector 11 and the unit casing 15.

The casing cover 18 is fixed to the unit casing 15 by a screw 22 with the casing cover 18 in contact with the backward end surface 15b of the unit casing 15, with a backward rubber packing 17 interposed between the unit casing 15 and the casing cover 18.

The lever-holding casing 12 has a rear opening 12a which engages the engaging portion 11a of the male connector 11. The rear end surface 12b of the lever-holding casing 12 is brought into contact with the front end surface 15a of the unit casing 15. A plurality of screws not shown is tightened into a plurality of screw openings 12g, 15g, 16g, and 11g to fix the lever-holding casing 12 to the unit casing 15.

A lever 24 is rotatably supported by a shaft (not shown) on an inner surface of the lever-holding casing 12. A guide pin 30 which engages a guide concave portion 24a of the lever 24 is formed on an outer surface of the female connector 10 or on an outer surface of the cover 14. Upon rotation of the lever 24, the female connector 10 is moved in the engaging direction or the disengaging direction by the cooperation of the guide pin 30 and the guide concave portion 24a.

The method of assembling the lever type connector is described below.

Figure 3:
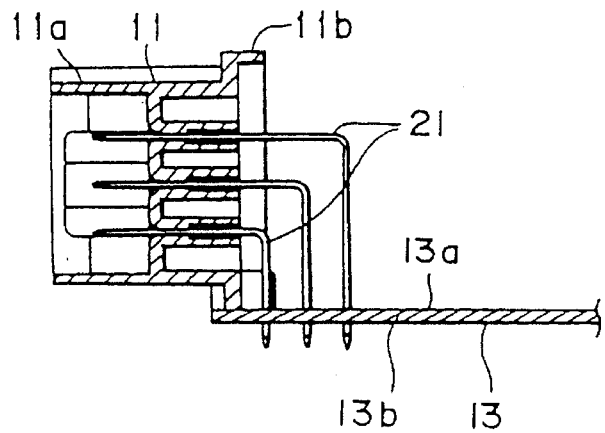
FIG. 3 is a sectional view showing the relationship between a male connector and a printed wiring board.
Figure 4:
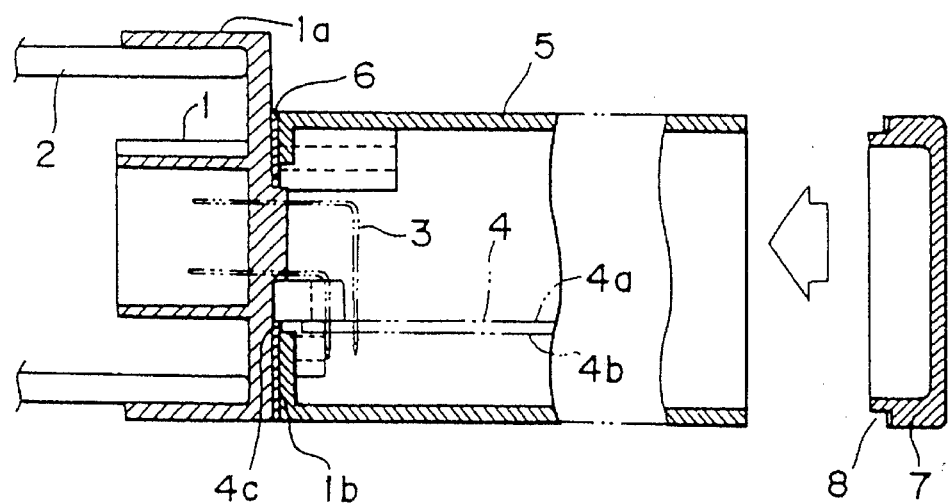
FIG. 4 is a sectional view showing a conventional lever type connector.
Figure 5:
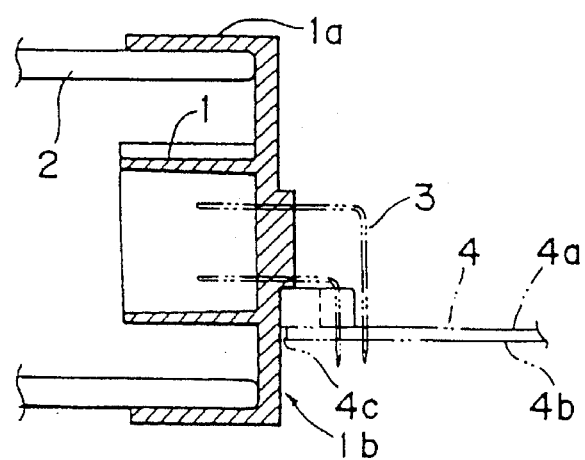
FIG. 5 is a sectional view showing the relationship between the conventional lever type connector and a printed wiring board.

Referring to FIG. 3, the flange portion 11b of the male connector 11 is fixed to the upper surface 13a of the printed wiring board 13 by the screw 20, and the tab 21 of the male connector 11 is downwardly inserted into the inserting opening of the printed wiring board 13 in the direction from the upper surface 13a of the printed wiring board 13 so as to project the tab 21 downward from the lower surface 13b. Other components are installed on the printed wiring board 13.

The tab 21 of the male connector 11 is fixed to the lower surface 13b of the printed wiring board 13 by flow soldering. Since the lever-holding casing 12 is not installed on the male connector 11 at this time, there is no possibility that the lever-holding casing 12 is immersed in a tank containing solder. In addition, since the flange portion 11b, serving as the sealing surface, formed on the male connector 11 is fixed to the upper surface 13a of the printed wiring board 13, there is no possibility that the flange portion 11b is immersed in the tank containing solder. Therefore, even though the lower surface 13b of the printed wiring board 13 is immersed in the tank, neither the lever 24 of the lever-holding casing 12 nor the flange portion 11b (sealing surface) is soiled or thermally deformed.

After the tab 21 of the male connector 11 is soldered on the printed wiring board 13, the male connector 11 and the printed wiring board 13 connected with each other are inserted forward into the unit casing 15 in the direction from the backward end surface 15b thereof so as to project the engaging portion 11a of the male connector 11 from the front end surface 15a of the unit casing 15, and the flange portion 11b is brought into contact with the inner flange portion 15c with the forward rubber packing 16 interposed between the male connector 11 and the unit casing 15. Then, screws 50 are tightened in the direction from the front end surface 15a toward the rear side of the unit casing 15 so as to fix the lever-holding casing 12 to the unit casing 15.

Then, in fixing the lever-holding casing 12 to the unit casing 15, screws are tightened with the rear end surface 12b of the lever-holding casing 12 in contact with the front end surface 15a of the unit casing 15. The casing cover 18 is fixed to the unit casing 15 by tightening the screw 22, with the casing cover 18 in contact with the backward end surface 15b of the unit casing 15 with the backward rubber packing 17 interposed between the casing cover 18 and the unit casing 15.

As described above, in the embodiment, after the tab 21 is soldered on the printed wiring board 13, the lever-holding casing 12 is mounted on the unit casing 15.

Accordingly, the lever 24 and the flange portion 11b are not soiled by solder or deformed by the heat of solder, and thus the flange portion 11b is in close contact with the inner flange portion 15c. Hence, the gap between the male connector 11 and the unit casing 15 can be preferably sealed.

The female connector 10 can be engaged by the male connector 11 or disengaged therefrom by rotating the lever 24 of the lever-holding casing 12 with a small force applied to the lever 24. After the female connector 10 is engaged by the male connector 11, the front end opening 12d of the lever-holding casing 12 is sealed with the cover 14.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lever type connector comprising:

a lever for moving a second connector in an engaging and a disengaging direction for respectively engaging and disengaging a first connector and the second connector with respect to each other, said first connector being installed on an upper surface of a printed wiring board having a plurality of inserting openings, said first connector only projecting upwardly from said upper surface of said printed wiring board;

a plurality of tabs of said first connector being inserted downward into each inserting opening of the printed wiring board, the tabs being soldered onto a lower surface of the printed wiring board;

a recess formed by a puncture of said first connector with said upper surface of said printed wiring board, said recess adapted for receiving a seal for waterproofing said connector, wherein said recess is adapted to maintain the seal above said lower surface of said printed wiring board to prevent damage to the sealing capability of the seal during the soldering of the tabs; and a lever-holding casing holding the lever therein being installed on said first connector, whereby said lever-holding casing does not project downward from said lower surface of said printed wiring board during soldering.

2. The connector as defined in claim 1, further comprising a seal for waterproofing said connector, at least a portion of said seal being received within said recess.

3. The connector as defined in claim 1, wherein said first connector includes a first flange portion located only above the upper surface of said printed wiring board, a unit casing for covering said printed wiring board, said unit casing including a second flange portion for engaging said first flange portion.

4. The connector as defined in claim 3, further comprising a packing member between said first connector and said unit casing.

* * * * *

UNITED STATES PATENT AND TRADEMARK OFFICE
CERTIFICATE OF CORRECTION

PATENT NO. : 5,507,659
DATED : April 16, 1996
INVENTOR(S) : T. SUMIDA et al.

It is certified that error appears in the above-indentified patent and that said Letters Patent is hereby corrected as shown below:

At column 4, line 66 (claim 1, line 14), change "puncture" to ---juncture---.

Signed and Sealed this

Twenty-sixth Day of November 1996

Attest:

BRUCE LEHMAN

*Attesting Officer*     *Commissioner of Patents and Trademarks*